July 8, 1958 W. J. GREENLEAF 2,842,233
CUTTING BLADE LOCK
Filed Dec. 19, 1956

INVENTOR.
Walter J. Greenleaf
BY Ralph Hammer
attorney

United States Patent Office 2,842,233
Patented July 8, 1958

2,842,233

CUTTING BLADE LOCK

Walter J. Greenleaf, Meadville, Pa.

Application December 19, 1956, Serial No. 629,340

2 Claims. (Cl. 189—36)

This invention is a cartridge type lock for clamping or wedging in place the blades or bits of milling cutters, reamers and the like. The lock is self contained and eliminates the necessity of tapping holes in the cutter.

The body of the lock is a cylinder, flattened on one side, which engages one side of a cutting blade and clamps it against a blade seat. The locking or wedging action is obtained from a wedge slidable in an inclined hole in the body by a screw threaded into the wedge and rotatably anchored in a slot in the body. Alternatively, the screw may be threaded in the body and rotatably anchored in the wedge.

Figure 1:
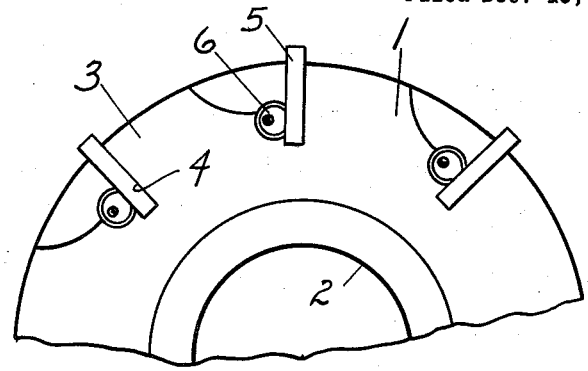
Figure 2:
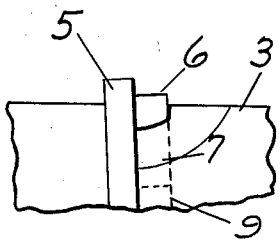
Figure 3:
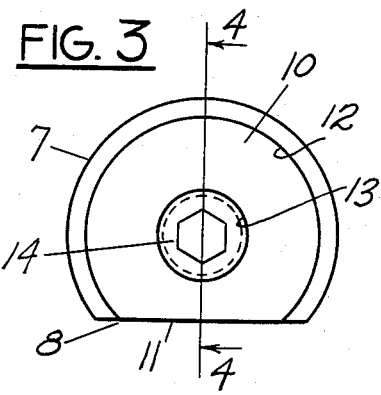
Figure 4:
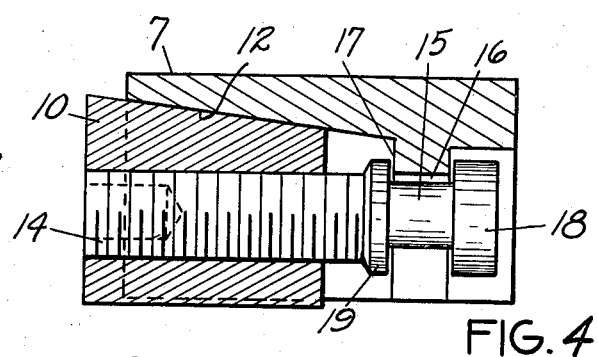
Figure 6:
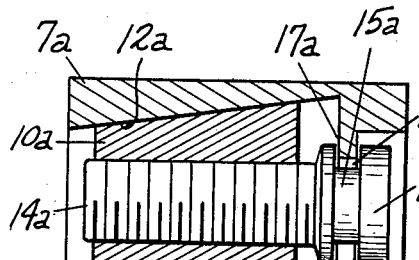
Figure 5:
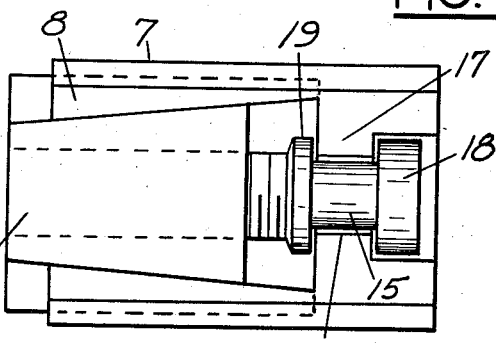
Figure 7:
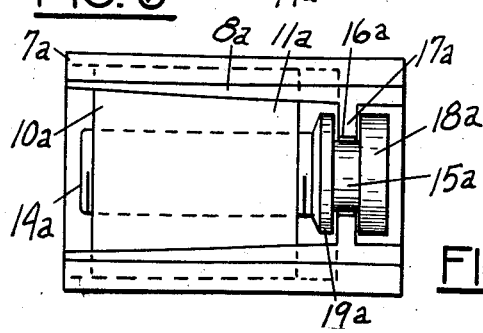

In the drawing, Fig. 1 is a fragmentary end view of a milling cutter equipped with blade locks embodying my invention; Fig. 2 is a fragmentary edge view of the milling cutter; Fig. 3 is an end view of the blade lock; Fig. 4 is a section on line 4—4 of Fig. 3; Fig. 5 is a bottom view of the blade lock; Fig. 6 is a longitudinal section of a modification of the blade lock; and Fig. 7 is a bottom view of the modification.

The blade locks are shown applied to the milling cutter of application Serial No. 572,964 filed March 21, 1956, where the body 1 of the cutter is provided at its center with an arbor hole 2 for mounting the cutter on the spindle and around the rim 3 of the body are a plurality of flat seats 4 for indexable cutting bits 5 of hard metal such as carbide. The seats 4 are inclined to provide the desired cutting clearance both in radial and axial directions and the cutter also has other seats (not shown) engaging the edges of the bit and locating it so that indexing the bit to bring a new cutting edge into active or cutting position will not change the relative position of the cutting edges. The bits 5 are held in index position by blade locks 6 which clamp the bits against the seats 4. The blade locks must positively clamp the bits against the seat 4 for cutting or milling and must be readily releasable so as to permit indexing or clamping of the bits. These advantages are obtained with the blade locks illustrated in Figs. 3 to 7, inclusive.

In the blade lock shown in Figs. 3, 4 and 5, the body 7 is a cylinder having a flat 8 at one side parallel to its longitudinal axis. The blade lock will, accordingly, fit in a hole 9 bored in the milling cutter body 1 parallel to the seat 4 for the bit 5. In its released or unlocked position, the blade lock will readily slip into the hole 9 with its flat surface 8 adjacent but in non-clamping or locking relation to the bit 5. In the unlocked position, the bits 5 can be easily indexed or replaced. It will be noted that it is not necessary to tap holes in the cutter body to clamp or lock the blades in place. The boring of the holes 9 for receiving the blade locks is a much simpler operation. The clamping or locking action of the blade lock is effected by a cylindrical wedge 10 having a flat 11 which matches the flat 8 in the released position of the lock. The cylindrical wedge 10 is slidable in a hole 12 drilled in the body 7 at a wedging angle with relation to the flat 8, for example, an angle of about 8°. A tapped hole 13 at the center of the wedge 10 receives an axially extending screw 14. It is not necessary that the hole 13 be parallel to the surface 8 but having the hole parallel to the surface 8 permits the use of a larger and stronger screw. The screw 14 is rotatably anchored in the body 7 of the lock by a neck 15 slidably received in a slot 16 in a web 17 perpendicular to the screw 14. It will be noted that both ends of the screw are accessible so the screw may be turned from either end. A circular head 18 provides a shoulder which anchors the screw so far as movement to the left is concerned while a shoulder 19 on the opposite side of the neck 15 anchors the screw so far as movement to the right is concerned. The slot 16 provides sufficient clearance so that binding of the screw 14 in the tapped hole 13 is prevented. If binding did occur, the user might think the lock was tight before adequate clamping had been obtained. When the screw 14 is turned in the clamping direction, the cylindrical wedge 10 is moved to the right and its flat surface 11 is forced into clamping engagement with the bit 5. The head 18 of the screw 14 cooperates with the web 17 to transmit the force of the screw 14 to the cylindrical wedge 10. Upon turning the screw 14 in the direction to release the clamping action, the force of the screw is transmitted to the web by the shoulder 19.

The blade lock is very easy to make. The body 7 of the lock is a cylindrical piece with a flat 8 on one side and with an inclined hole 12 bored from one end. At the opposite end, the web 17 and the slot 16 for receiving the neck 15 of the clamping screw 14 can easily be milled. The clamping member 10 is likewise made from a cylindrical piece having a sliding fit in the hole 9 and having a flat 11 parallel to the flat 8 on the body of the lock. A tapped hole 13 parallel to the flat surface 8 receives the clamping screw 14. Binding of the clamping screw is prevented by the sliding fit between the neck 15 of the screw in the slot 16 in the web 17.

In the blade lock shown in Figs. 3, 4 and 5, the cylindrical wedging member 10 is pulled into the bore in the clamping position and is pushed out of the bore to release. Figs. 6 and 7 show a blade lock which is of the same construction except that the cylindrical wedging member 10a is pushed out of the bore for clamping and is pulled into the bore for releasing. The parts are of substantially identical construction except that the inclination of the hole 12a is opposite to the inclination of the hole 12 in the Figs. 3–5 lock. There is the same ease of manufacture and the same absence of any requirement for accurate alignment of the clamping screw 14a. Because of the similarity in construction and operation, corresponding parts are identified throughout with the subscript "a," and it is believed that no further description is needed of this modification. In the Figs. 6 and 7 lock, there is no possibility of the lock being used beyond its capacity. When the wedge is pushed too far, it comes off the end of the screw thereby warning the user that the clamp cannot be used until shims are placed between the blade and seat. When the wedge is pulled into the bore in the clamping position as in Fig. 3, the wedge at the bottom of the bore will encounter a stop which may mislead the user into believing the resistance to further travel indicates that the blade is clamped. Of course, this problem does not arise if the lock is used within its rated capacity.

What is claimed as new is:

1. A self contained cartridge type lock for locking a cutting blade against a seat on a cutting tool comprising a cylindrical body adapted in the released condition of the lock to be slidably received in a socket in the cutting tool in front of the seat, said body having a bore extending inward from one end of the body and terminating short of the other end of the body, said bore being inclined to the axis of said body at a wedging angle and intersecting said body throughout the length of the bore on the side of the body facing the seat whereby the bore is open throughout its length on that side of the body, a web in the body at the termination of the bore, a slot in the web extending into the body from the side of the body facing the seat and forming a direct continuation of the bore, a cylindrical wedge slidably received in the bore and constructed to project progressively out the open side of the bore as moved along the bore in a wedging or locking direction and to thereby exert a clamping force on the blade, an axially extending screw threaded into the wedge and rotatably received in the slot, said screw being slidable in the slot transverse to the axis of the screw, the open side of the bore and the slot being of width sufficient to permit the screw to be inserted laterally, shoulders on the screw cooperating with the body to transmit thrust from the screw to the body, and means accessible from one end of the lock for turning the screw.

2. A self contained cartridge type lock for locking a cutting blade against a seat on a cutting tool comprising a cylindrical body adapted in the released condition of the lock to be slidably received in a socket in the cutting tool in front of the seat, said body having a bore extending inward from one end of the body and terminating short of the other end of the body, said bore being inclined to the axis of said body at a wedging angle and intersecting said body throughout the length of the bore on the side of the body facing the seat whereby the bore is open throughout its length on that side of the body, a slot extending into the body from the side of the body facing the seat and forming a direct continuation of the bore, a cylindrical wedge slidably received in the bore and constructed to project progressively out the open side of the bore as moved along the bore in a wedging or locking direction and to thereby exert a clamping force on the blade, an axially extending screw threaded into the wedge and rotatably received in the slot, said screw being slidable in the slot transverse to the axis of the screw, the open side of the bore and the slot being of width sufficient to permit the screw to be inserted laterally, shoulders on the screw cooperating with the body to transmit thrust from the screw to the body, and means accessible from one end of the lock for turning the screw.

References Cited in the file of this patent

UNITED STATES PATENTS

| | | |
|---|---|---|
| 2,304,311 | Luce | Dec. 8, 1942 |
| 2,547,789 | Skeel | Apr. 3, 1951 |